United States Patent
Rydsmo et al.

(10) Patent No.: US 8,414,027 B2
(45) Date of Patent: Apr. 9, 2013

(54) SEAT BELT TENSIONER HAVING A METAL BAND FOR FORCE TRANSMISSION

(75) Inventors: Erik Arthur Rydsmo, Sollebrunn (SE); Linus Karl Axel Larsson, Vara (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/993,962

(22) PCT Filed: May 26, 2009

(86) PCT No.: PCT/EP2009/003713
§ 371 (c)(1), (2), (4) Date: Nov. 22, 2010

(87) PCT Pub. No.: WO2009/152929
PCT Pub. Date: Dec. 23, 2009

(65) Prior Publication Data
US 2011/0074142 A1    Mar. 31, 2011

(30) Foreign Application Priority Data
May 26, 2008   (DE) .......................... 10 2008 025 094

(51) Int. Cl.
*B60R 22/46* (2006.01)
(52) U.S. Cl.
USPC ............................ 280/806; 297/480; 242/374
(58) Field of Classification Search .................. 280/806; 297/478, 480; 60/632, 638; 102/530, 531; 242/374, 379.1
See application file for complete search history.

(56) References Cited

U.S. PATENT DOCUMENTS

| | | | | |
|---|---|---|---|---|
| 4,932,603 A * | 6/1990 | Yamanoi et al. | ............... | 242/374 |
| 5,222,994 A * | 6/1993 | Hamaue | ........................ | 242/374 |
| 5,588,608 A * | 12/1996 | Imai et al. | ..................... | 242/374 |
| 5,899,399 A * | 5/1999 | Brown et al. | .................. | 242/374 |
| 6,419,177 B2 * | 7/2002 | Stevens | ......................... | 242/374 |
| 6,708,914 B2 * | 3/2004 | Stevens | ......................... | 242/374 |
| 7,350,819 B2 * | 4/2008 | Stevens et al. | ................ | 280/806 |
| 7,448,649 B2 * | 11/2008 | Dunham et al. | ............... | 280/806 |
| 2001/0030254 A1 * | 10/2001 | Stevens et al. | ................ | 242/374 |
| 2006/0097506 A1 | 5/2006 | Stevens | | |

FOREIGN PATENT DOCUMENTS

WO       WO 01/56844 A1      8/2001

OTHER PUBLICATIONS

PCT/EP2009/003713—International Search Report—Sep. 23, 2009.

* cited by examiner

*Primary Examiner* — Drew Brown
(74) *Attorney, Agent, or Firm* — Brinks Hofer Gilson & Lione

(57) ABSTRACT

A seat belt tensioner for motor vehicle, having a belt shaft (12) rotatably supported in housing as a carrier of a seat belt wound thereon and with a tensioner drive coupled thereto by a metal strip (18), the drive rotatable driving the belt shaft (12) when triggered by action on the metal strip (18) and the movement thereof, the metal band (18) before triggering the tensioning drive (10) surrounds an extension (13) of the belt shaft. The metal strip (18) is wound around the extension (13) of the belt shaft (12) in at least one winding turn serving as winding supply (20) for the movement thereof. The winding reserve (20) is held at a radial gap (21) to the extension (13) of the belt shaft (12) by a holding element (22) releasing the metal band (18) in case of tensile force acting on the metal strip caused by activation of the belt tensioner causing the metal stripto engage and rotate the belt shaft extension.

15 Claims, 4 Drawing Sheets

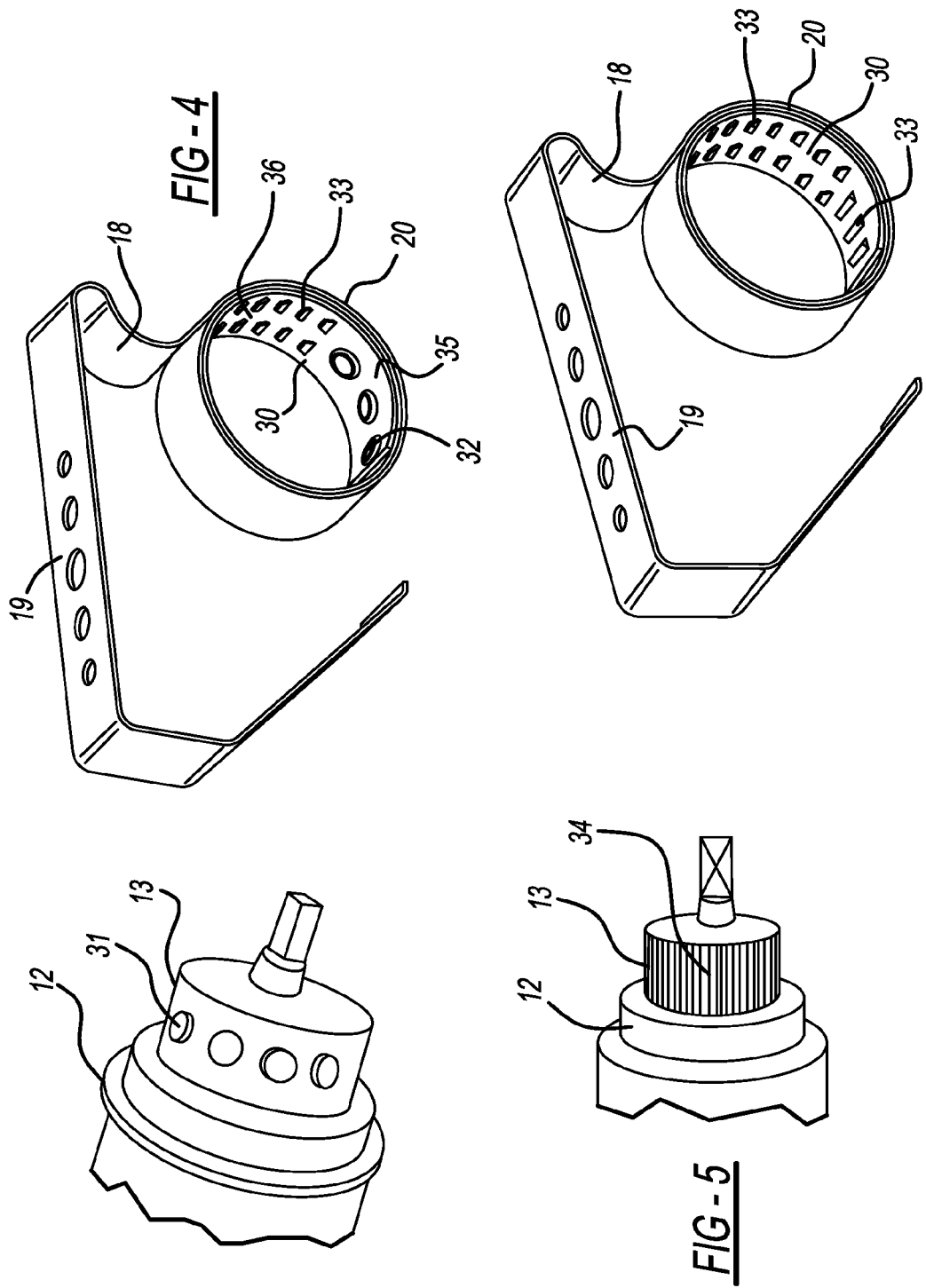

SEAT BELT TENSIONER HAVING A METAL BAND FOR FORCE TRANSMISSION

CROSS REFERENCE TO RELATED APPLICATIONS

This application claims priority to German Patent Application No. 102008025094.5, filed May 26, 2008 and PCT/EP2009/003713, filed May 26, 2009.

FIELD OF THE INVENTION

The invention relates to a belt tensioner for motor vehicles having a belt shaft, mounted in a housing so it is rotatable, as a carrier of a belt strapped wound thereon and having a tensioner drive coupled thereto via a metal strip, which drives the belt shaft and sets it into rotation upon triggering via action on the metal strip and its movement, the metal strip enclosing an extension of the belt shaft around at least a part of its circumference at a distance before triggering of the tensioner drive.

BACKGROUND OF THE INVENTION

A belt tensioner having the above-mentioned features is known from US 2006/0097506 A1. The tensioner drive, which has a linearly movable piston, is situated eccentrically and at a distance to the belt shaft of the belt retractor. A metal strip is guided transversely over the movement path of the piston as the transference means for the linear movement of the piston into a rotational movement of the belt shaft and is stopped having one end fixed on a housing part, while the other loose end of the metal strip is guided partially wrapped around an extension of the belt shaft and guided further from here in a linear course as a reserve for the movement of the metal strip when the tensioner drive is activated. The metal strip is supported against a housing wall which encloses the shaft extension in the area of its partial wrap around the shaft extension before the tensioner drive is triggered, so that the metal strip forms a gap or clearance to the shaft extension. For better connection of the shaft extension to the metal strip during the tensioning procedure caused by the movement of the metal strip, the shaft extension has radially projecting pins, which engage in one or more perforations situated correspondingly in the metal strip. If the pyrotechnically actuated tensioner drive is triggered, the resulting gases drive the piston, which engages the metal strip guided transversely over its movement path and thus initiates a traction movement on the free end of the metal strip, which forms a winding reserve. This traction movement has the result that the metal strip is now wrapped around the extension of the belt shaft while overcoming the initially set clearance and sets the belt shaft into rotation because of the formfitting engagement with the shaft extension.

The known belt tensioner has the disadvantage that because of the winding reserve housed using a linear course, a correspondingly larger space is required for the belt tensioner.

The invention is therefore based on the object of implementing a belt tensioner having the features according to the species cited at the beginning as more compact in its construction.

The achievement of this object, including advantageous embodiments and refinements of the invention, results from the contents of the patent claims which are appended to this description.

SUMMARY OF THE INVENTION

In its basic idea, the invention provides that the metal strip is wrapped around the extension of the belt shaft in at least one turn serving as a winding reserve for its movement and the winding reserve is held at a distance (radial clearance gap) to the extension of the belt shaft by means of a retention element which releases the metal strip upon tension load during activation of the belt tensioner. The advantage is connected to the invention that because of the stockpile of the metal strip implemented as a winding reserve wrapping around the shaft extension, a reduction of the overall size is provided; maintaining the radial gap distance of the winding reserve to the extension of the belt shaft is advantageously caused by a separate retention element, which releases the metal strip upon a tension load triggered by the tensioner drive being activated.

According to one exemplary embodiment of the invention, the winding reserve of metal strip comprises a plurality of turns wrapped around the extension of the belt shaft. In this manner, in spite of an appropriately large stockpiled length of metal strip, the dimensions of the belt tensioner may still be kept small.

The advantage of fixing of the winding reserve during the mounting and during operation of the motor vehicle before triggering of the tensioner drive is connected to one exemplary embodiment of the invention, in which the winding reserve is supported on at least a part of its circumference by a housing part which encloses the extension of the belt shaft, in an expedient embodiment, the winding reserve being arranged in a recess formed in the housing part.

To ensure a release of the winding reserve upon triggering of the tensioner drive, according to one exemplary embodiment of the invention, the retention element is formed as a pin radially penetrating the winding reserve, having an intended breakpoint.

According to an alternative embodiment the retention element is formed from at least one clip overlapping the winding reserve on its outer circumference with a hook-shaped projection and secured on a housing part and having an intended breakpoint.

Because the winding reserve encloses the extension of the belt shaft around its entire circumference, to couple the metal strip to the shaft extension to rotate it, it is sufficient according to one exemplary embodiment of the invention if the external surface of the extension of the belt shaft is provided with a friction-increasing design.

In order to avoid a slipping of the winding reserve over the extension of the belt shaft upon triggering of the tensioner drive, according to one embodiment of the invention, the external surface of the extension of the belt shaft and the end section of the metal strip, situated in the interior of the winding reserve and coming in contact with the belt shaft upon triggering of the tensioner drive, is provided with configurations coming into engagement with each other, so that a kind of an interlocking connection between the winding reserve and the extension of the belt shaft occurs which minimizes the lost motion during tensioning.

According to a first embodiment of the invention, the extension of the belt shaft is provided on at least a part of its circumference with pin-like projections, with which recesses are associated which are introduced into the end section of the metal strip. According to an improved embodiment, the recesses are formed in a region of the extent of the end section adjoining the end the metal strip, and in a region of the end section adjoining thereto elevations are provided raised from the surface of the metal strip in the direction of the wrapped-around extension of the belt shaft. As far as recesses are formed only in a part of the end section of the metal strip wrapping around the extension of the belt shaft excessive weakening of the metal strip is avoided. Further elevations raised from the surface of the metal strip are arranged in a region adjacent to the region having the recesses, the elevations are engaging the profile of the extension whereby the strength of the metal strip is given by the elevations.

According to an alternative embodiment of the invention, the extension of the belt shaft is provided over its circumference with a ribbing, consisting of elevations on one side, running transversely to the wrapping direction of the metal strip, and the end section of the metal strip is provided with elevations raised from the surface of the metal strip in the direction of the wrapped-around extension of the belt shaft. At this embodiment the ribbing of the extension and the elevations of the metal strip engaging therein form a sufficiently rigid connection between the metal strip and the extension of the belt shaft.

Also at this embodiment recesses can be arranged in the front region of the end section of the metal strip which can be formed with circumferential edges projecting in the direction of the wrapped around extension of the belt shaft, and which engage the ribbing provided on the belt shaft and are catching therein.

For a further improvement of the interlocking connection between the extension of the belt shaft having a ribbing and the metal strip having elevations according to one embodiment of the invention the elevations raised from the surface of the metal strip are formed with an inclined position into the direction of rotation of the winding reserve upon triggering of the tensioner drive.

As known from US 2006/0097506 A1, which represents a type according to one exemplary embodiment of the invention, the tensioner drive is implemented as a linear tensioner having a linearly movable piston acting on the metal strip, the free end of the metal strip leading away from the winding reserve of metal strip being guided by the movement path of the piston and being fastened to a part fixed on the housing.

BRIEF DESCRIPTION OF THE DRAWINGS

Embodiments of the invention are shown within the drawings which are described in the following:

FIGS. 4 and 5 show alternative embodiments for a positive connection of the winding reserve and the belt shaft extension.

DETAILED DESCRIPTION OF THE INVENTION

Figure 1:
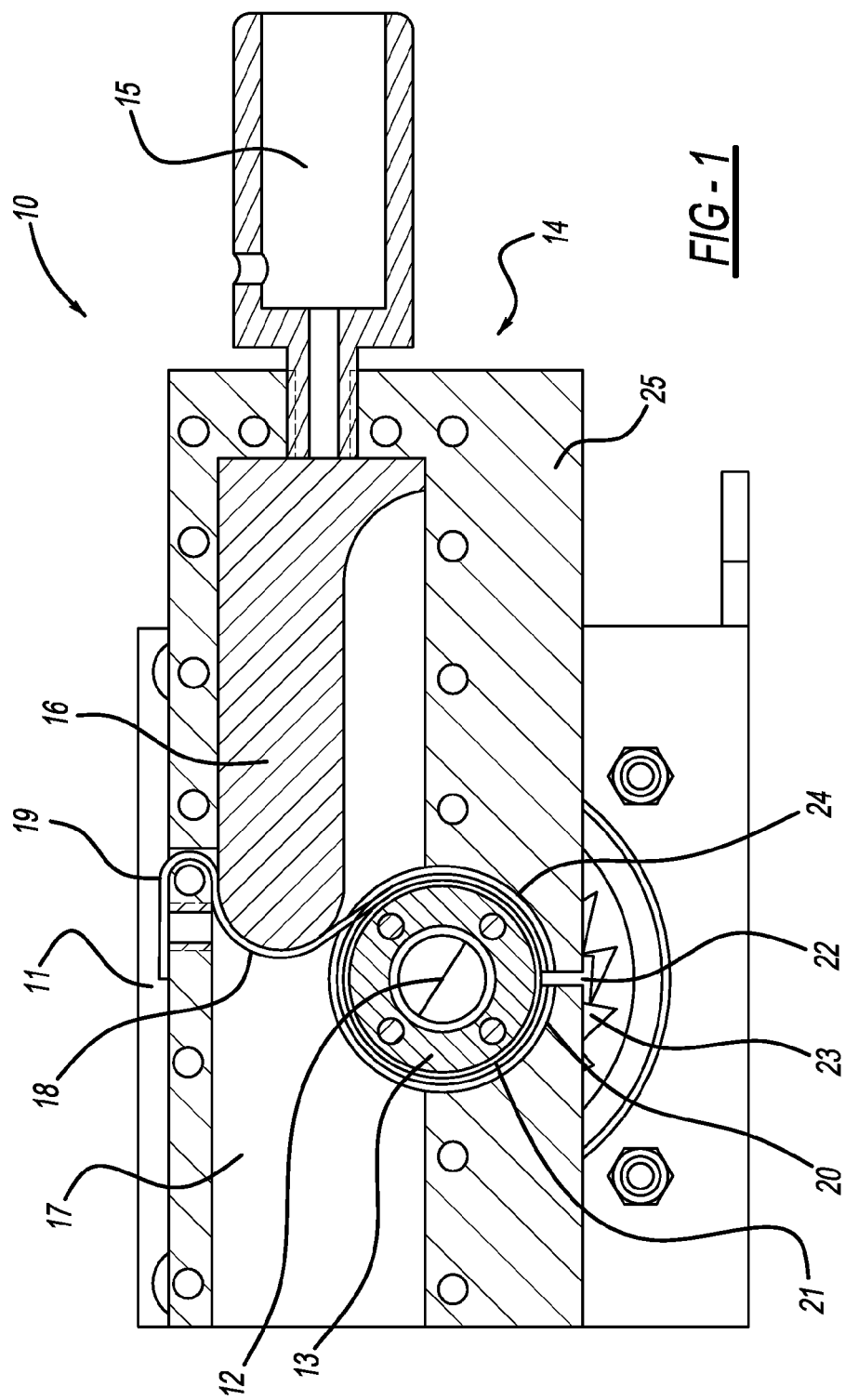
FIG. 1 shows a belt tensioner in a schematic, partially sectional side view before triggering of the tensioner drive.

The belt tensioner 10 schematically shown in FIG. 1 has a housing 11, in which a belt shaft 12, on which a safety belt is wound, is mounted so it is rotatable in a known manner. The construction of a belt winder of this type as a part of a belt tensioner is known in the prior art in manifold embodiments. A gearing 23 implemented in the housing 11 is shown in the drawing, which is a component of a blocking (or locking) system known per se for the belt shaft 12, which is not however, the subject matter of the present invention.

A tensioner drive 14 having a tensioner housing 25 is situated laterally on the housing 11, which has a pyrotechnic propellant charge 15 and a piston 16 movable in a piston chamber 17 implemented in the tensioner housing 25. An extension 13 of the belt shaft 12 projects into the plane of the tensioner housing 25 in such a manner that the extension 13 of the belt shaft 12 is situated eccentrically and at a distance to the movement path of the piston 16 in the piston chamber 17.

To transfer the linear movement of the piston 16 into a rotational movement of the belt shaft 12, a metal strip 18 is situated, which is fastened at one end 19 on the tensioner housing 25 and extends transversely over the movement path of the piston 16 into the piston chamber 17 to the extension 13 of the belt shaft 12. The metal strip 18 is wrapped here in multiple turns around the extension 13 of the belt shaft 12 and thus forms a winding reserve 20, which, in the functional position before triggering of the tensioner drive 14 shown in FIG. 1, forms a radial gap 21 to the extension 13 of the belt shaft 12, so that the winding reserve 20 does not interfere with the normal rotational movement of the belt shaft 12 and extension 13 during the f normal operation of the belt winder. For maintaining the radial gap 21, the winding reserve 20 is secured by a retention element 22 which in one embodiment is in the form of a pin which radially penetrates the winding reserve 20. Furthermore, a recess 24 is formed in the tensioner housing 25 which partially receives the winding reserve 20 and thus supports the winding reserve 20 in its rest state.

If the tensioner drive 14 is triggered, the gases released by the pyrotechnic propellant charge 15 drive the piston 16 and displace it linearly in the piston chamber 17. The piston 16 impinges the metal strip 18 and pulls it off of the winding reserve 20. Because of this tension load occurring, the turns of the winding reserve 20 of metal strip 18 wrap closely around the extension 13 of the belt shaft 12, so that because of the friction or interlocking engagement thus occurring, as the metal strip 18 is progressively drawn off the winding reserve 20, the belt shaft 12 is caused to rotate. In order that the retention element 22 does not interfere with this unwinding procedure, the retention element is provided in a way not shown in greater detail with an intended breakpoint and shears off when tension load occurs.

Figure 2:
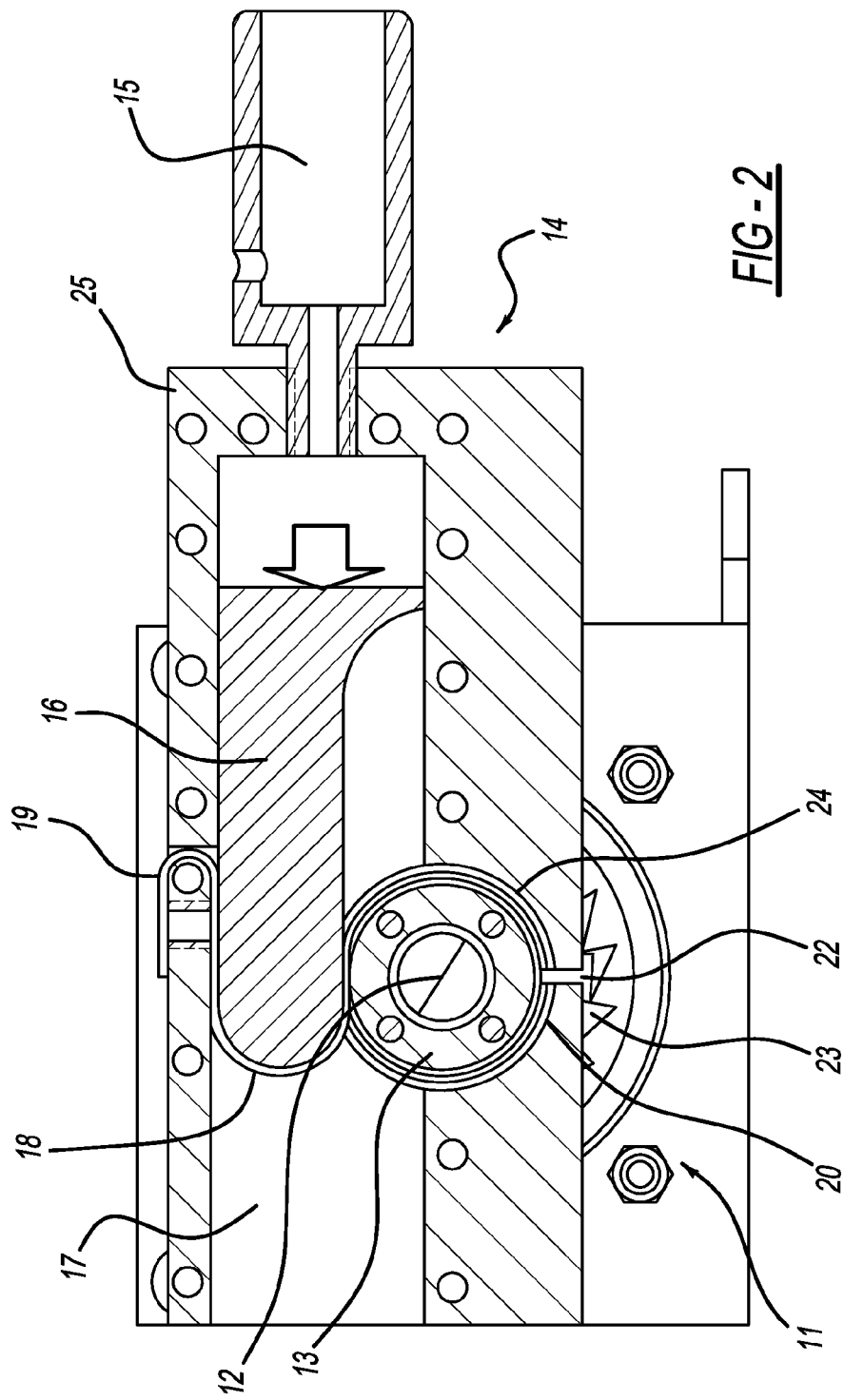
FIG. 2 shows the belt tensioner of FIG. 1 after triggering of the tensioner drive during the tensioning procedure.
Figure 3:
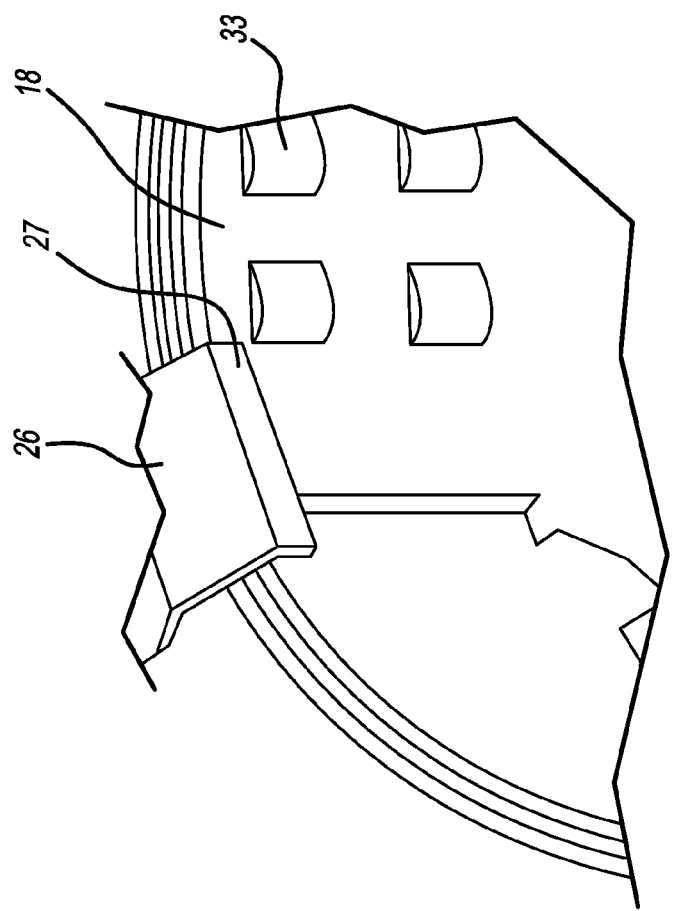
FIG. 3 shows an alternative embodiment of the retention device of the belt tensioner.

FIG. 3 shows an alternative embodiment with regard to the retention device 22 for the winding reserve 20 shown in FIGS. 1 and 2. In the exemplary embodiment which can be seen from FIG. 3, this retention device consists of a bracket 26 which surrounds the winding reserve 20 of the metal strip 18 on its outer circumference and overlaps the winding reserve with a hook-shaped protrusion 27, wherein the bracket 26 has an intended break point so that it releases the winding reserve 20 when the tensioner drive is triggered. A second bracket 26 is provided in a symmetrical arrangement on the opposite side to the bracket 26 shown in FIG. 3 so that the winding reserve 20 is fixed or retained on both sides. In this case, it is also possible to configure the further bracket 26 opposite the bracket 26 shown in FIG. 3 as a housing projection in which the winding reserve 20 is inserted accordingly.

FIGS. 4 and 5 show alternative exemplary embodiments for a positive connection of the winding reserve 20 to the extension 13 of the belt shaft 12. As is initially deduced for this from FIG. 4, the outer surface of the extension 13 of the belt shaft 12 is provided with pin-like projections 31 on its circumference. Accordingly, recesses 32 which can engage with the pin-like projections 31 are formed in the end portion 30 of the winding reserve 20 which lays around the extension 13 when the tensioner drive is triggered. In order that the recesses 32 do not cause a weakening of the metal strip 18 over the entire length portion of the end portion, the recesses 32 are only formed in a first region 35 adjoining the end of the metal strip 18, wherein elevations 33 raised out from the surface of the metal strip, which also engage with the pin-like projections 31, are disposed in the adjoining region 36 of the metal strip.

Figure 6:
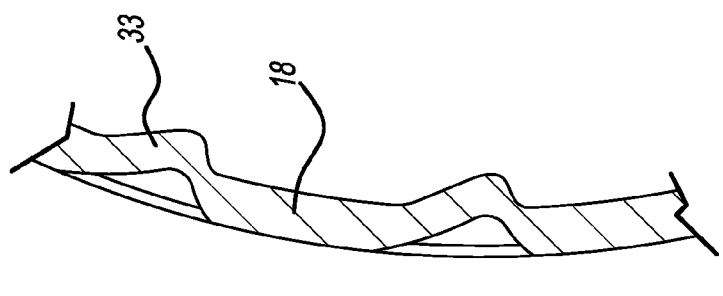
FIG. 6 is a side view of the elevations of the metal strip shown in FIG. 5.

Alternatively, according to FIG. 5 it can also be provided that the extension 13 of the belt shaft 12 is provided with a ribbing 34 consisting of individual ridges running transversely to the wrapping direction of the metal strip 18 over its circumference, wherein the end portion 30 of the metal strip 18 wrapping around the extension 13 of the belt shaft 12 on triggering the tensioner drive is provided with elevations 33 which correspond to the elevations described for FIG. 4. As can be seen from FIG. 6, it is advantageous if the elevations 33 have a position inclined in the direction of turning of the winding reserve 20 on triggering the tensioner drive.

As not shown further, the configuration of the end portion 30 according to FIG. 4 can cooperate with an extension 13 of the belt shaft 12 provided with a ribbing 34 provided that the recesses 32 are formed with circumferential edges protruding in the direction of the extension 13 so that these circumferential edges also engage with the fluting.

The features of the subject matter of this application disclosed in the preceding description, the claims, the abstract, and the drawing may be essential individually and also in arbitrary combinations with one another for implementing the invention in its various embodiments.

While the above description constitutes the preferred embodiment of the present invention, it will be appreciated that the invention is susceptible to modification, variation and change without departing from the proper scope and fair meaning of the accompanying claims.

The invention claimed is:

1. A belt tensioner for motor vehicles comprising a belt shaft, mounted in a housing as a carrier of a seat belt strap wound thereon and having a tensioner drive coupled thereto via a metal strip which drives the belt shaft and causes it to rotate upon triggering by acting on the metal strip with a tension force, an end of the metal strip is wrapped around an extension of the belt shaft in at least one turn serving as a winding reserve for its movement, the winding reserve being held at a radial gap to the extension of the belt shaft by means of a retention element directly engaging the metal strip before triggering of the tensioner drive, the retention element being configured to release the metal strip by yielding to the tension force upon the triggering, allowing the end of the metal strip to engage the extension.

2. The belt tensioner according to claim 1 further comprising that the winding reserve of metal strip comprises a plurality of turns wrapped around the extension of the belt shaft.

3. The belt tensioner according to claim 1 further comprising that the winding reserve is supported on at least a part of its circumference by a housing part which encloses the extension of the belt shaft.

4. The belt tensioner according to claim 3, further comprising that the winding reserve is arranged in a recess formed in the housing part.

5. The belt tensioner according to claim 1 further comprising that the tensioner drive is formed as a linear tensioner having a linearly movable piston acting on the metal strip.

6. The belt tensioner according to claim 1 further comprising that a free end of the metal strip leading away from the winding reserve of metal strip is guided through the movement path of the piston and fastened to a part fixed on the housing.

7. A belt tensioner for motor vehicles comprising a belt shaft, mounted in a housing as a carrier of a seat belt strap wound thereon and having a tensioner drive coupled thereto via a metal strip which drives the belt shaft and causes it to rotate upon triggering by acting on the metal strip, an end of the metal strip is wrapped around the extension of the belt shaft in at least one turn serving as a winding reserve for its movement and the winding reserve is held at a radial gap to the extension of the belt shaft by means of a retention element before triggering of the tensioner drive, the retention element releases the metal strip upon the triggering allowing the end of the metal strip to engage the extension, further comprising that the retention element is formed as a pin, radially penetrating the winding reserve and having an intended breakpoint upon the triggering of the belt tensioner.

8. A belt tensioner for motor vehicles comprising a belt shaft, mounted in a housing as a carrier of a seat belt strap wound thereon and having a tensioner drive coupled thereto via a metal strip which drives the belt shaft and causes it to rotate upon triggering by acting on the metal strip, an end of the metal strip is wrapped around the extension of the belt shaft in at least one turn serving as a winding reserve for its movement and the winding reserve is held at a radial gap to the extension of the belt shaft by means of a retention element before triggering of the tensioner drive, the retention element releases the metal strip upon the triggering allowing the end of the metal strip to engage the extension, further comprising that the retention element is formed from at least one clip overlapping the winding reserve on its outer circumference with a hook-shaped projection and secured on a housing part and having an intended breakpoint upon the triggering of the belt tensioner.

9. The belt tensioner according to claim 1 further comprising that the external surface of the extension of the belt shaft is provided with a friction-increasing design.

10. A belt tensioner for motor vehicles comprising a belt shaft, mounted in a housing as a carrier of a seat belt strap wound thereon and having a tensioner drive coupled thereto via a metal strip which drives the belt shaft and causes it to rotate upon triggering by acting on the metal strip, an end of the metal strip is wrapped around the extension of the belt shaft in at least one turn serving as a winding reserve for its movement and the winding reserve is held at a radial gap to the extension of the belt shaft by means of a retention element before triggering of the tensioner drive, the retention element releases the metal strip upon the triggering allowing the end of the metal strip to engage the extension, further comprising that the external surface of the extension of the belt shaft and the end section of the metal strip, situated in the interior of the winding reserve and coming in contact with the belt shaft upon triggering of the tensioner drive are provided with configurations coming into engagement with each other.

11. The belt tensioner according to claim 10, further comprising that the extension of the belt shaft is provided on at least a part of its circumference with pin-like projections which interengage with recesses formed into the end section of the metal strip upon the triggering of the belt tensioner.

12. The belt tensioner according to claim 11, further comprising that the recesses are formed in a first region of the extent of the end section adjoining the end of the metal strip, and in a second region of the end section adjoining thereto is provided with elevations raised from the surface of the metal strip in the direction of the wrapped-around extension of the belt shaft.

13. The belt tensioner according to claim 12 further comprising that the recesses formed in the first region of the end section of the metal strip are formed with circumferential edges projecting in the direction of the extension of the belt shaft.

14. The belt tensioner according to claim 12 further comprising that the elevations raised from the surface of the metal strip are formed with an inclined position oriented in the direction of rotation of the winding reserve upon triggering of the tensioner drive.

15. The belt tensioner according to claim 10, further comprising that the extension of the belt shaft is provided over its circumference with a ribbing, consisting of elevations on one side, running transversely to the wrapping direction of the metal strip, and the end section of the metal strip is provided with elevations raised from the surface of the metal strip in the direction of the wrapped-around extension of the belt shaft.

* * * * *